United States Patent
Kojima et al.

(10) Patent No.: US 9,900,484 B2
(45) Date of Patent: Feb. 20, 2018

(54) WHITE BALANCE ADJUSTMENT METHOD AND IMAGING DEVICE FOR MEDICAL INSTRUMENT

(75) Inventors: Kazuaki Kojima, Mizuho (JP); Takashi Tanimoto, Gifu-ken (JP); Takayuki Sato, Kochi (JP)

(73) Assignees: Semiconductor Components Industries, LLC, Phoenix, AZ (US); National University Corporation Kochi University, Kochi-Ken (JP)

( * ) Notice: Subject to any disclaimer, the term of this patent is extended or adjusted under 35 U.S.C. 154(b) by 911 days.

(21) Appl. No.: 13/188,680

(22) Filed: Jul. 22, 2011

(65) Prior Publication Data
US 2012/0026339 A1 Feb. 2, 2012

(30) Foreign Application Priority Data
Jul. 28, 2010 (JP) ................. 2010-169802

(51) Int. Cl.
H04N 5/225 (2006.01)
H04N 5/33 (2006.01)
H04N 9/73 (2006.01)

(52) U.S. Cl.
CPC ........... *H04N 5/2256* (2013.01); *H04N 5/332* (2013.01); *H04N 9/735* (2013.01); *H04N 2005/2255* (2013.01)

(58) Field of Classification Search
CPC ............................. H04N 5/33; H04N 5/2256
USPC ....................................................... 348/164
See application file for complete search history.

(56) References Cited

U.S. PATENT DOCUMENTS

| 4,878,113 A | * | 10/1989 | Nakamura | A61B 1/0638 348/164 |
| 5,255,087 A | * | 10/1993 | Nakamura | A61B 1/05 348/164 |
| 5,306,144 A | * | 4/1994 | Hibst | A61B 5/0088 356/317 |
| 5,438,989 A | * | 8/1995 | Hochman | A61B 5/0059 348/164 |
| 5,699,798 A | * | 12/1997 | Hochman | A61B 5/0059 348/164 |
| 6,028,622 A | * | 2/2000 | Suzuki | A61B 1/00186 348/65 |

(Continued)

FOREIGN PATENT DOCUMENTS

| JP | H10201707 A | 8/1998 |
| JP | 2000041942 A | 2/2000 |

(Continued)

*Primary Examiner* — Jay Patel
*Assistant Examiner* — Irfan Habib
(74) *Attorney, Agent, or Firm* — Osha Liang LLP

(57) ABSTRACT

A method includes the steps of emitting infrared light of a predetermined wavelength to an object, receiving infrared light of a predetermined wavelength different from the infrared light emitted from the object, and adjusting white balance of an image output from a camera at this time, thereby showing the incident infrared light as white. The method further includes the steps of emitting white visible light to the object from an RGB light source, receiving visible light emitted from the object, and adjusting the intensity of the RGB light source for each of R, G, and B, thereby adjusting white balance of a captured image.

6 Claims, 3 Drawing Sheets

(56) References Cited

U.S. PATENT DOCUMENTS

| | | | | |
|---|---|---|---|---|
| 6,053,731 A * | 4/2000 | Heckenberger | A61B 5/0088 | 433/29 |
| 6,186,780 B1 * | 2/2001 | Hibst | A61B 5/0088 | 433/215 |
| 6,293,911 B1 | 9/2001 | Imaizumi et al. | | |
| 6,464,633 B1 * | 10/2002 | Hosoda | A61B 1/0638 | 348/68 |
| 6,522,407 B2 * | 2/2003 | Everett | A61B 5/0073 | 356/364 |
| 6,635,011 B1 * | 10/2003 | Ozawa | A61B 1/00096 | 348/E5.029 |
| 6,974,240 B2 * | 12/2005 | Takahashi | A61B 1/045 | 362/293 |
| 7,306,533 B2 * | 12/2007 | Ito | G02B 23/2469 | 362/574 |
| 7,560,709 B2 * | 7/2009 | Kimura | G02B 21/002 | 250/458.1 |
| 7,705,855 B2 * | 4/2010 | Brown | 345/589 | |
| 7,791,009 B2 * | 9/2010 | Johnston | A61B 1/0005 | 250/208.1 |
| 8,167,796 B2 * | 5/2012 | Negishi | A61B 1/0669 | 362/574 |
| 8,248,256 B1 * | 8/2012 | Gerardi | G08B 21/20 | 340/604 |
| 8,284,245 B2 * | 10/2012 | Takemura | A61B 1/04 | 348/65 |
| 8,357,899 B2 * | 1/2013 | Liu et al. | 250/332 | |
| 8,427,534 B2 * | 4/2013 | Tashiro | H04N 5/2256 | 348/64 |
| 8,542,272 B2 * | 9/2013 | Takei | A61B 1/00096 | 348/45 |
| 8,581,970 B2 * | 11/2013 | Yamazaki | A61B 1/0638 | 348/65 |
| 8,630,698 B2 * | 1/2014 | Fengler | A61B 1/00009 | 600/160 |
| 8,696,555 B2 * | 4/2014 | Mizuno | A61B 1/045 | 600/178 |
| 8,711,252 B2 * | 4/2014 | On | H04N 5/213 | 348/241 |
| 8,872,906 B2 * | 10/2014 | Bayer | A61B 1/00096 | 348/45 |
| 8,937,652 B2 * | 1/2015 | Ariyoshi | A61B 1/00 | 348/68 |
| 9,621,781 B2 * | 4/2017 | On | H04N 5/23212 | |
| 9,629,530 B2 * | 4/2017 | Niida | H04N 5/2256 | |
| 2001/0055462 A1 * | 12/2001 | Seibel | A61B 1/00048 | 385/147 |
| 2003/0229270 A1 * | 12/2003 | Suzuki | A61B 1/043 | 600/178 |
| 2004/0122291 A1 * | 6/2004 | Takahashi | A61B 1/0638 | 600/180 |
| 2004/0186351 A1 * | 9/2004 | Imaizumi | A61B 1/00009 | 600/160 |
| 2004/0267091 A1 * | 12/2004 | Imaizumi | A61B 1/0638 | 600/109 |
| 2005/0027166 A1 * | 2/2005 | Matsumoto | A61B 1/041 | 600/162 |
| 2006/0072843 A1 * | 4/2006 | Johnston | G06K 9/20 | 382/254 |
| 2006/0072874 A1 * | 4/2006 | Johnston | A61B 1/0008 | 385/25 |
| 2006/0177129 A1 | 8/2006 | Matsuyama | | |
| 2007/0100207 A1 * | 5/2007 | Ueno | A61B 1/00009 | 600/160 |
| 2008/0049115 A1 * | 2/2008 | Ohyama | H04N 5/2224 | 348/222.1 |
| 2008/0100910 A1 * | 5/2008 | Kim | G02B 5/282 | 359/356 |
| 2008/0194930 A1 * | 8/2008 | Harris | A61B 90/35 | 600/310 |
| 2008/0283729 A1 * | 11/2008 | Hosaka | H04N 5/332 | 250/208.1 |
| 2009/0093681 A1 * | 4/2009 | Ichimura | A61B 1/00096 | 600/178 |
| 2009/0118578 A1 * | 5/2009 | Takasugi | A61B 1/043 | 600/109 |
| 2009/0177043 A1 * | 7/2009 | Akiyama | A61B 1/00096 | 600/181 |
| 2010/0002292 A1 * | 1/2010 | Yabe | A61B 1/05 | 359/388 |
| 2010/0097454 A1 * | 4/2010 | Kubo | A61B 1/00188 | 348/65 |
| 2010/0128117 A1 * | 5/2010 | Dyer | 348/78 | |
| 2010/0168588 A1 * | 7/2010 | Matsumoto | A61B 1/041 | 600/478 |
| 2010/0177184 A1 * | 7/2010 | Berryhill | A61B 5/0059 | 348/77 |
| 2010/0182452 A1 * | 7/2010 | Utsugi | 348/231.2 | |
| 2010/0245532 A1 * | 9/2010 | Kurtz et al. | 348/14.03 | |
| 2010/0256448 A1 * | 10/2010 | Smith et al. | 600/156 | |
| 2010/0305455 A1 * | 12/2010 | Frangioni | 600/476 | |
| 2011/0025951 A1 * | 2/2011 | Jones | 349/70 | |
| 2011/0063427 A1 * | 3/2011 | Fengler | A61B 1/00186 | 348/65 |
| 2011/0235017 A1 * | 9/2011 | Iwasaki | 356/4.01 | |
| 2011/0249157 A1 * | 10/2011 | Fredembach et al. | 348/273 | |
| 2012/0147165 A1 * | 6/2012 | Yoshino | H04N 5/23212 | 348/65 |
| 2014/0031624 A1 * | 1/2014 | Godo | A61B 1/0684 | 600/109 |

FOREIGN PATENT DOCUMENTS

| | | |
|---|---|---|
| JP | 2005198750 A | 7/2005 |
| JP | 2006223591 A | 8/2006 |

* cited by examiner

WHITE BALANCE ADJUSTMENT METHOD AND IMAGING DEVICE FOR MEDICAL INSTRUMENT

CROSS-REFERENCE TO RELATED APPLICATIONS

The entire disclosure of Japanese Patent Application No. 2010-169802 filed on Jul. 28, 2010, including specification, claims, drawings, and abstract, is incorporated herein by reference in its entirety.

BACKGROUND OF INVENTION

Field of the Invention

One or more embodiments of the present invention relate to a white balance adjustment method for displaying an infrared light image and an RGB image simultaneously.

Background Art

In recent years, it has become possible to navigate surgery, specifically, identify blood flow before and after blood vessel surgery, identify lymph flow before and after lymphatic vessel surgery, and identify a position of a lymph node in cancer surgery, by employing indocyanine green which has been used as a test agent in hepatic function tests. This is achieved by capturing near-infrared fluorescence of 830-870 nm which is emitted from indocyanine green irradiated with infrared rays of 780 nm. Because near-infrared light of this band has relatively high transmission through living tissues, and thus observation from the skin or the surface of the organs becomes possible, it is an advantageous method.

As a camera system using a similar type of near-infrared light is desired to be applied to endoscopes, there is no doubt that the camera system will be developed and applied to endoscopes in the future. Furthermore, the camera system is also expected to be applied to, for example, microscopes.

Already-marketed endoscope systems for capturing near-infrared fluorescence do not have sufficient specifications for surgery navigation in that an image is monochrome and an image obtained by light other than near-infrared light is unclear. Further, although a high resolution camera is required for identifying, for example, minute cancer tissue, such a camera does not exist yet.

A camera system that can simultaneously capture near-infrared fluorescence and a color image has been achieved by employing a special color filter and a sensor adopting a special image processing technique. Further, the same result can be achieved by capturing a near-infrared image and a visible light color image separately and superimposing them in subsequent processing. However, in order to develop a high resolution camera system in the future, a vast number of man-hours are required as it is necessary to develop a special sensor dedicated to the camera system and provide a system employing a plurality of sensors to superimpose images.

It is desired to provide a camera system which can be realized with a single sensor and no special color filter, and which can capture a near-infrared image and a color image simultaneously in real time without requiring superimposition processing at a subsequent stage.

SUMMARY OF THE INVENTION

One or more embodiments of the present invention are directed to a camera system which can obtain a near-infrared light image and a visible light color image simultaneously using a general image sensor, and includes the steps of emitting infrared light of a predetermined wavelength to an object, receiving infrared light of a predetermined wavelength that is different from the infrared light emitted from the object, and adjusting white balance of an image output from a camera to show the received infrared light as white, and emitting white visible light to the object from an RGB light source, receiving visible light emitted from the object, and adjusting the intensity of the RGB light source for each of R, G, and B, thereby adjusting white balance of a captured image.

It becomes possible to simultaneously capture an infrared light image generated by indocyanine green, etc. and a usual RGB image of the organs, etc., and display them simultaneously using an image sensor which does not have a special color filter. Therefore, it becomes possible to readily provide a camera system for surgery navigation which employs an image sensor most suitable for endoscopes, microscope cameras, and so on.

DETAILED DESCRIPTION

One or more embodiments of the present invention will be described hereinafter based on the drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
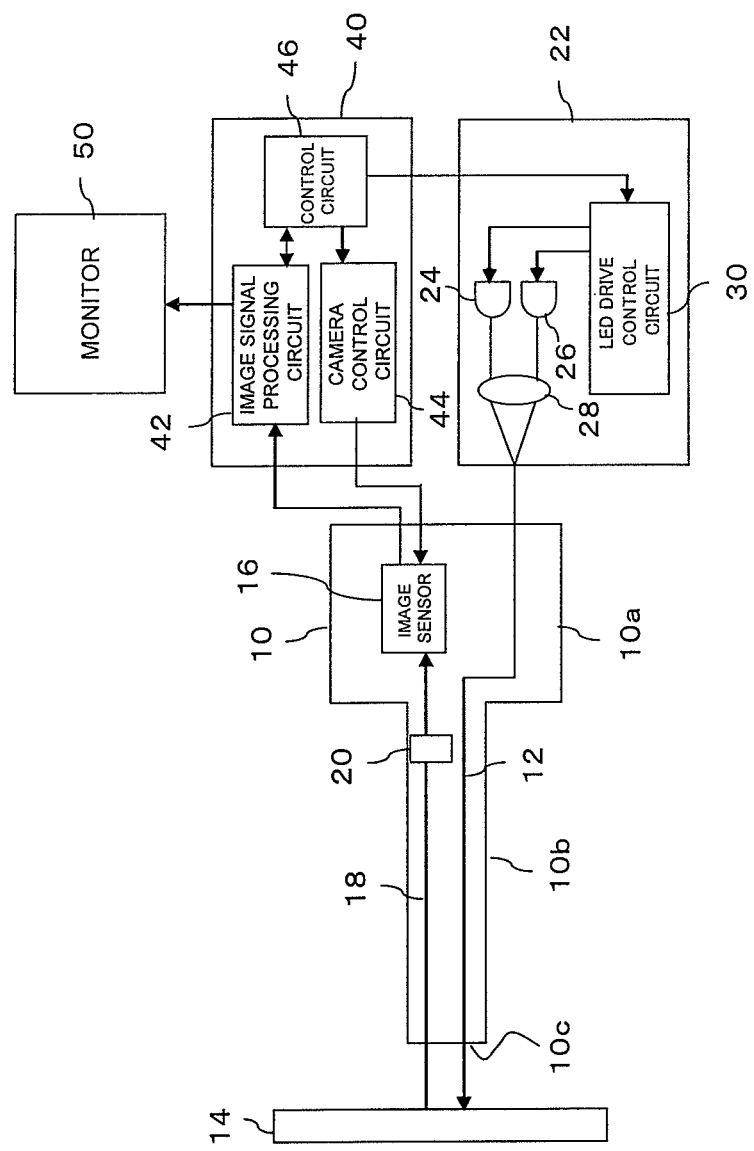
FIG. 1 shows an overall configuration of an imaging system according to one or more embodiments of the present invention.

FIG. 1 shows a configuration of an imaging system including a white balance adjustment device according to one or more embodiments of the present invention. A camera body 10 contains an irradiation light guide 12 for receiving irradiation light from outside, and guiding and emitting the irradiation light to an object 14. In addition, the camera body 10 also contains a received light guide 18 for receiving and guiding light from the object 14. This received light guide 18 guides the received light to an image sensor 16 via an infrared cut filter 20. Although FIG. 1 shows an endoscope, one or more embodiments of the present invention are also advantageous in applications other than an endoscope where outside light (light except for illumination included in one or more embodiments of the present invention) has less influence.

In the camera 10, a base part 10a is relatively large and contains the image sensor 16 inside. A light receiving end of the irradiation light guide 12 is formed on the back surface of this base part 10a. Further, an output part which outputs image signals from the image sensor 16 is also formed on the back surface of the base part 10a. Meanwhile, the tip side of the camera body 10 is an elongated rod-shaped part 10b, and on a tip 10c thereof, an emitting part for emitting irradiation light from the irradiation light guide 12 and a light receiving part for receiving light from the object 14 and introducing the light to the received light guide 18 are formed.

In one or more embodiments of the present invention, the rod-shaped part 10b is inserted into, for example, the patient's organ, and a target affected area (object 14) is irradiated with light emitted from the tip 10c to thereby capture an image by near-infrared light and visible light emitted from the object.

The irradiation light guide 12 and the received light guide 18 are made of optical fibers which visible light and infrared light can pass through. Optical systems, such as lenses, are arranged in the irradiation light emitting part and the light receiving part for light emitted from the object, if desired. Further, although a charge coupled device (CCD) imaging device is used as the image sensor 16, a complementary metal oxide semiconductor (CMOS) imaging device may also be used.

Furthermore, the infrared cut filter 20 for removing infrared light of a predetermined wavelength is provided at a previous stage of the image sensor 16. This is provided in order to prevent light which is obtained by allowing emitted infrared light (described later) to be reflected without change, from being input into the image sensor 16.

The light receiving part of the irradiation light guide 12 on the back surface of the camera body 10 is supplied with irradiation light from a light source device 22. In one or more embodiments of the present invention, the irradiation light receiving part on the back surface of the camera body 10 and the light emitting part of the light source device 22 are connected to each other with flexible light fibers, etc. The light source device 22 has an IR light (infrared light) LED (light emitting diode) 24 and a visible light LED 26 having independent light sources for R, G, and B. Then, light emitted from the IR light LED 24 and the visible light LED 26 is supplied to the irradiation light guide 12 of the camera body 10 via a lens 28.

Further, emission of irradiation light from the IR light LED 24 and the visible light LED 26 is controlled by an LED drive control circuit 30. Particularly, in one or more embodiments of the present invention, the IR light LED 24 emits infrared light of 780 nm, while the visible light LED 26 includes three LEDs for emitting red light (R), green light (G), and blue light (B), respectively, and the intensity of light emission of R, G, and B can be independently controlled by the LED drive control circuit 30.

An image signal from the image sensor 16 is supplied to a signal processing circuit 40. This signal processing circuit 40 is provided with an image signal processing circuit 42 and a camera control circuit 44. The camera control circuit 44 controls the operation of the image sensor 16. The image sensor 16 supplies the image signal to the image signal processing circuit 42. The image signal processing circuit 42 performs a variety of processing and supplies an output signal (such as an NTSC image signal and an RGB signal) to an outside monitor 50. The outside monitor 50 displays a captured image. In the signal processing circuit 40, a control circuit 46 is provided to control the processing operation of the image signal processing circuit 42 and the camera control circuit 44.

Further, this control circuit 46 also carries out white balance adjustment in the image signal processing circuit 42 and adjustment of the intensity of light emission for each of R, G, and B in the LED drive control circuit 30.

In such an imaging system, usually, both of the IR light LED 24 and the visible light LED 26 are turned on, and both of infrared light and visible light is emitted to the object 14 via the lens 28 and the irradiation light guide 12.

The infrared cut filter 20 removes, from the light emitted from the object, the light of 780 nm which is output from the IR light LED 24 and reflected as it is, and the resulting light reaches the image sensor 16. The object 14 is an organ of a living organism such as a human body and is injected with indocyanine green in advance. As such, near-infrared fluorescence of 830-870 nm is generated in, for example, blood vessels in which indocyanine green exists. The image sensor 16 captures this near-infrared fluorescence and reflection light of the visible light which is emitted from the visible light LED 26 and reflected on the object 14.

Figure 2:
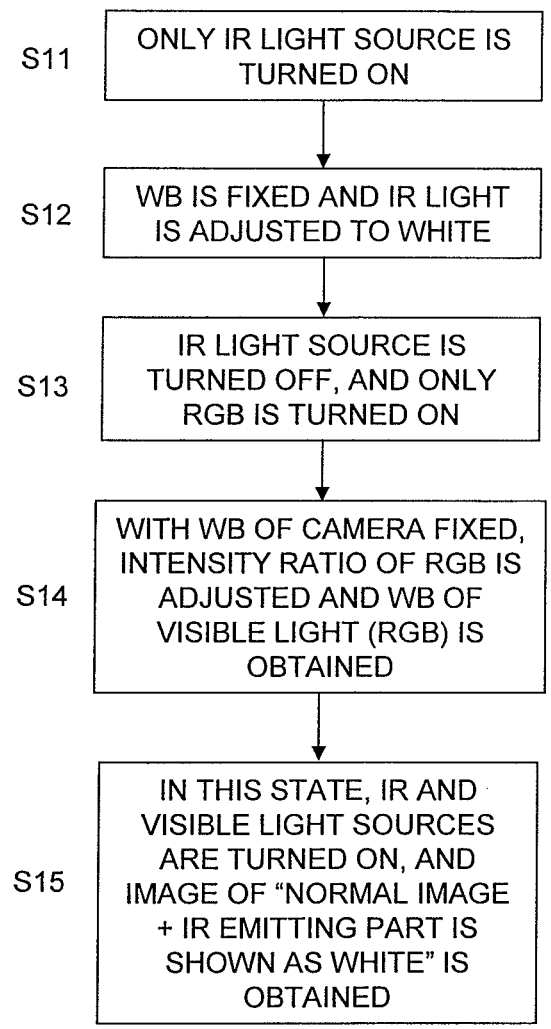
FIG. 2 shows a flowchart showing a processing procedure according to one or more embodiments of the present invention.

Meanwhile, in the present imaging system, white balance adjustment is carried out prior to normal image capturing according to the procedure shown in FIG. 2.

First, only the IR light LED 24 serving as an IR light source is turned on (S11). In this state, the image signal processing circuit 42 adjusts white balance using its auto white balance function (AWB function) so as to make an output image signal white (S12).

When the IR light LED 24 emits the infrared light of 780 nm to the object, the object 14 emits reflection light which is the light of 780 nm as it is and only two types of light of near-infrared fluorescence of 830-870 nm emitted from indocyanine green. Because the light of 780 nm is removed by the infrared cut filter 20, only the two types of light of the near-infrared fluorescence of 830-870 nm emitted from indocyanine green enter the image sensor 16. The white balance adjustment function then sets a color of the near-infrared fluorescence to white. In other words, the balance of RGB signals generated in the image sensor 16 by the incident light is adjusted to white. The image sensor 16 has pixels for R, G, and B independently, and output signals from these pixels become RGB signals. Even when only near-infrared fluorescence due to indocyanine green enters the image sensor 16, it is also possible to make an output image signal white by adjusting the balance of RGB (coefficients to multiply R, G, and B) as the image sensor 16 generates image signals for each of R, G, and B according to the incident near-infrared light. It is also possible to change the color setting of an image signal corresponding to near-infrared fluorescence to colors other than white.

Then, the IR light source (IR light LED 24) is turned off, and only the visible light source (visible light LED 26) is turned on (S13). In this state, with the white balance adjusted as described above and fixed, the intensity of light emission of each color of R, G, and B is adjusted in the visible light LED 26, thereby adjusting white balance of an output from the image sensor 16 (S14). Such adjustment of white balance may be carried out based on detection of a color temperature normally carried out in an auto white balance adjustment device, may be carried out according to an input by the user looking at the display of the monitor 50, or may be a combination of both. Although it is auto white balance adjustment, white balance adjustment in this case means adjustment on the RGB light source side, and it does not mean usual processing on the image signal side.

As such, the white balance adjustment of a visible light image is performed by adjusting the emission intensity of R, G, and B of the light source of visible light with the white balance fixed on the image signal processing side of the camera. In one or more embodiments of the present invention, images are used in, for example, surgery using an endoscope. It is therefore possible to provide the above-described settings even when there is no outside light.

Thus, an image of the near-infrared light emitted from indocyanine green is set to white, while for the visible light, white balance adjustment of an image signal is performed by adjusting the balance of the intensity of irradiation light of R, G, and B. Then, in this state, the IR light source (IR light LED 24) and the RGB light source (visible light LED 26) are both turned on to thereby obtain an image signal (S15). An image obtained here is "a normal image+an IR emitting part shown as white". It is also possible to set an image of near-infrared light emitted from indocyanine green to white as there is no white body tissue or fluid. It becomes easier to observe body tissue and fluid and near-infrared light emitted from indocyanine green separately by setting an image of near-infrared light to white. Further, because a white shadow which is usually not supposed to be shown in an image of the inside the body is shown in an image signal, it becomes easier to identify near-infrared light emitted from indocyanine green.

As such, in one or more embodiments of the present invention, an IR image is provided using signals from each of RGB color pixels in the image sensor 16. It is therefore possible to use incident light effectively and obtain a good white image even with weak near-infrared fluorescence.

Further, because it is also possible to adjust white balance of a normal image sufficiently, an image according to the obtained image signals can be made clearer.

Although the above-described white balance adjustment may be automatically carried out when the power is on, it is also possible to start adjustment based on user's instructions provided via, for example, button operation. Then, it is possible to automatically carry out the operations of S11 to S15. It is also possible to obtain the user's confirmation by suspending the operation during both of white level adjustment of IR light and white level adjustment by RGB light. Then, if the user wishes to make a change, it is possible to receive the user's instructions provided via, for example, button operation, change setting values, and proceed to the next operation.

Figure 3:
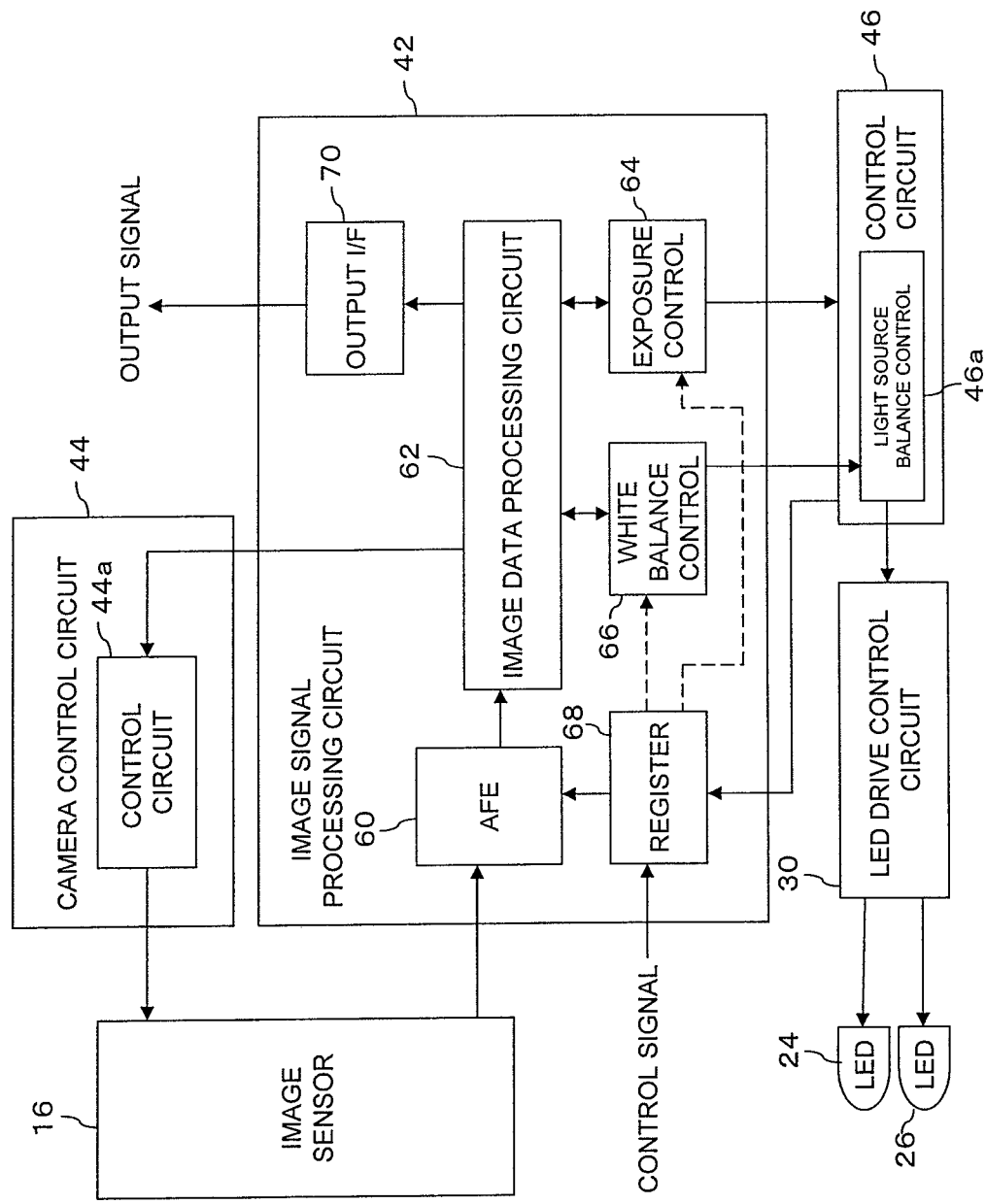
FIG. 3 shows details of an image signal processing circuit according to one or more embodiments of the present invention.

FIG. 3 shows the image signal processing circuit 42 of FIG. 1 in more detail. The image signal from the image sensor 16 is input to an auto front end (AFE) 60 in the image signal processing circuit 42. This AFE 60 performs amplification, A/D conversion, etc. on the image signal from the image sensor 16 to thereby obtain data which can be processed in a subsequent processing circuit. The AFE 60 inputs the digital image signal to the image data processing circuit 62, and the image data processing circuit 62 carries out a variety of processing to display the image signal on the monitor 50. The image data processing circuit 62 performs processing, such as gain adjustment, gamma compensation, color compensation, contour enhancement, and pixel defect compensation. This image data processing circuit 62 supplies an output signal to the monitor 50 via an output interface (I/F) 70, and the monitor 50 displays the output signal.

The image data processing circuit 62 is connected to an exposure control part 64. This exposure control part 64 controls exposure time according to image data. That is, the exposure control part 64 controls the drive circuit 44a of the camera control circuit 44 to thereby control a timing of charge-transfer of the image sensor 16 to thereby control exposure time for one screen. In addition, the image data processing circuit 62 is also connected to a WB control part 66. As described above, this WB control part controls the balance of RGB so that an output signal shows white when only near-infrared light is input. For example, assuming that coefficients for R, G, and B signals are a, b, and c, respectively, a, b, and c are calculated in such a manner that aR+bG+cB becomes white. This WB control part 66 is connected to a register 68. The calculated coefficients a, b, and c are stored in this register 68 and used in subsequent image data processing.

The register 68 also stores data of amplification factors used in the AFE 60, and gains of an amplifier circuit of the AFE 60 are controlled by the stored setting values. Further, the register 68 also stores setting values for exposure used in the exposure control part 64.

The white balance control part 66 and the exposure control part 64 are also connected to the control circuit 46. The control circuit 46 controls the LED drive control circuit 30 using a light source balance control part 46a located therein to thereby control the RGB balance of the visible light LED 26. The register 68 also stores data about the balance for each of R, G, and B of the visible LED 26. Further, the exposure control part 64 may control the emission amount of an LED according to the brightness, and the register 68 stores setting values in this case too.

Furthermore, the setting values stored in the register 68 can be rewritten by control signals from outside. It is therefore possible to change the setting values stored in the register 68 according to the user's preference or according to adjustment signals input by the user seeing the content of an image, thereby enabling adjustment of white balance, etc.

Although a case has been described in which a CCD is used as the image sensor 16, if a CMOS is employed, its output is digital, and therefore the AFE 60 does not need to carry out A/D conversion. Further, there is no need to control exposure time.

A general camera is provided with an IR cut filter for removing infrared noise. As one or more embodiments of the present invention needs to receive infrared light emitted from indocyanine green as described above, the IR cut filter is removed.

Further, near-infrared light emitted from indocyanine green has a relatively small intensity. It is therefore possible to adjust the overall intensity according to the intensity of near-infrared light during the white balance adjustment of the visible LED light 26. That is, upon the receipt of near-infrared fluorescence, the intensity of the visible light LED 26 is adjusted such that white light emission can be seen clearly enough. In doing so, it is possible to provide sufficient quality of display even with weak near-infrared light. It is also possible to attenuate visible light slightly using the above-described infrared cut filter 20.

Further, a drug is not limited to indocyanine green, and it is also possible to carry out white balance adjustment as appropriately as in one or more embodiments of the present invention by employing a drug which is excited by infrared light and emits light having a different wavelength from irradiation light.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What it is claimed is:

1. A method of displaying a captured image comprising
emitting infrared light of a predetermined wavelength to an object;
removing reflection light of the predetermined wavelength emitted from the object;
receiving infrared light of a predetermined wavelength that is different from the emitted infrared light of the predetermined wavelength;

adjusting white balance of an image output from a camera to show the received infrared light as white;

emitting white visible light to the object from an RGB light source, comprising: a R light source, a G light source, and a B light source;

receiving visible light emitted from the object;

adjusting the intensity of the RGB light source for each individually of the R, G, and B light sources respectively, thereby adjusting white balance of a captured image;

emitting both of the infrared light of the predetermined wavelength and the visible light in which the white balance is adjusted; and removing the infrared light of the predetermined wavelength emitted to the object, thereby obtaining a captured image.

2. The method according to claim 1, wherein the object is an organ of a patient.

3. The method according to claim 2, wherein the patient has been injected with indocyanine green; and wherein the infrared light emitted to the object is infrared light of 780 nm, while the received infrared light is near-infrared light of 830-870 nm obtained by removing the infrared light of 780 nm.

4. An imaging device comprising:

an infrared emission unit which emits infrared light of a predetermined wavelength to an object;

an RGB light source, comprising: a R light source, a G light source, and a B light source, wherein the RGB light source emits RGB light to the object, a light emission intensity of the RGB light source being adjustable for each of the R, G, and B light sources independently;

a filter which removes, from the light emitted from the object, the infrared light of the predeteimined wavelength emitted from the infrared emission unit;

a camera which receives light passing through the filter and outputs a captured image signal;

a white balance adjustment unit which adjust white balance so that the captured image signal received by the camera becomes white while the infrared light from the infrared emission unit is emitted to the object; and an RGB adjustment unit which adjusts, while the RGB light source emits light to the object and the white balance adjustment unit fixes the white balance, the light emission intensity of the RGB light source for each individually of the R, G, and B light sources respectively to thereby adjust white balance of a captured image signal output from the camera, wherein both of the infrared light of the predetermined wavelength from the infrared emission unit and the visible light in which the white balance is adjusted from the RGB light source is emitted, and the infrared light of the predetermined wavelength emitted to the object is removed from reflection light thereof by the filter, thereby obtaining a captured image by the camera.

5. The imaging device according to claim 4, wherein the infrared light emitted to the object and the visible light emitted to the object is received by the camera via one light guide which the visible light and the infrared light pass through.

6. The imaging device according to claim 4, wherein the infrared light emitted from the object and the visible light emitted from the object are received by the camera via one light guide which the visible light and the infrared light pass through.

* * * * *